United States Patent [19]
Le

[11] Patent Number: 5,142,904
[45] Date of Patent: Sep. 1, 1992

[54] ISOTHERMALLY MEASURED TIRE GAUGE

[76] Inventor: Mike Le, 8F, No. 164, Chung-Hsiao East Road, Sec. 3, Taipei, Taiwan

[21] Appl. No.: 720,951

[22] Filed: Jun. 25, 1991

[51] Int. Cl.$^5$ .................. B60C 23/04; G01L 7/06
[52] U.S. Cl. .................. 73/146.8; 73/730; 116/34 R
[58] Field of Search .............. 73/146.8, 730, 146.2, 73/146.3, ; 116/34 R; 137/227; 340/442

[56] References Cited

U.S. PATENT DOCUMENTS

| | | | |
|---|---|---|---|
| 3,230,968 | 1/1966 | Struby | 73/146.8 |
| 4,208,982 | 6/1980 | Byram | 73/146.2 |
| 4,384,543 | 5/1983 | Wong | 73/146.8 |
| 4,793,177 | 12/1988 | Wu et al. | 73/146.8 |
| 5,027,848 | 7/1991 | Leeuwen | 73/146.8 |

Primary Examiner—Donald O. Woodiel

[57] ABSTRACT

A tire gauge includes: a bellows telescopically mounted in an interior within a tire, a flexible indicator rod protruding outwardly from and secured with a piston member secured on a movable end portion of the bellows slidably held in a guiding tube either straightly or arcuately formed on an outer surface of the tire or combinably secured with a filling valve of the tire, so that the bellows will be subjected to a pressure inside a tire at a real temperature in the tire interior and the tire pressure will urge the bellows and the indicator rod outwardly to a final balanced position for showing a true pressure data which is measured isothermally inside the tire.

10 Claims, 4 Drawing Sheets

ISOTHERMALLY MEASURED TIRE GAUGE

BACKGROUND OF THE INVENTION

E. L. Larson et al disclosed an inflation valve and gauge in their U.S. Pat. No. 1,582,523 to combine an inflation valve and a gauge on a wheel tire for measuring tire pressure directly on the tire. However, such a conventional gauge still has the following drawbacks:

1. In measuring operation, the slidable tube 12 and the secured graduated sleeve 19 are slidably movable on the main tube 2 secured on the tire. After a long time service, the washer or nut 20 or any other packing rings may be worn to cause air leakage therefrom to influence measuring precision or decreasing tire pressure to even cause an accident.

2. The expansible rubber tube 7 is not a closed bag or sac filled with air therein and is positioned proximate a tire outer layer so that the pressure value measured by this device is influenced by a temperature change outside a tire especially after a high-speed running of a wheel tire to exert a frictional heat increasing the tire temperature suddenly.

3. The valve and gauge is vertically extended for a distance from the tire 1, which will be subjected to centrifugal force during a rotation of wheels when running a car, to thereby easily deform or break the inflation valve and gauge.

The present inventor has found the drawbacks of the conventional tire gauge and invented the present tire gauge for an isothermal measurement of tire pressure.

SUMMARY OF THE INVENTION

The object of the present invention is to provide a tire gauge including: a bellows telescopically mounted in an interior within a tire, a flexible indicator rod protruding outwardly from and secured with a piston member secured on a movable end portion of the bellows slidably held in a guiding tube either straightly or arcuately formed on an outer surface of the tire or combinably secured with a filling valve of the tire, the guiding tube and the bellows forming a closed air chamber, so that the bellows will be subjected to a pressure inside a tire at a real temperature in the tire interior and the tire pressure will urge the bellows and the indicator rod outwardly to a final balanced position for showing a true pressure data which is measured isothermally inside the tire.

other preferred embodiment of the present invention.

Figure 7:
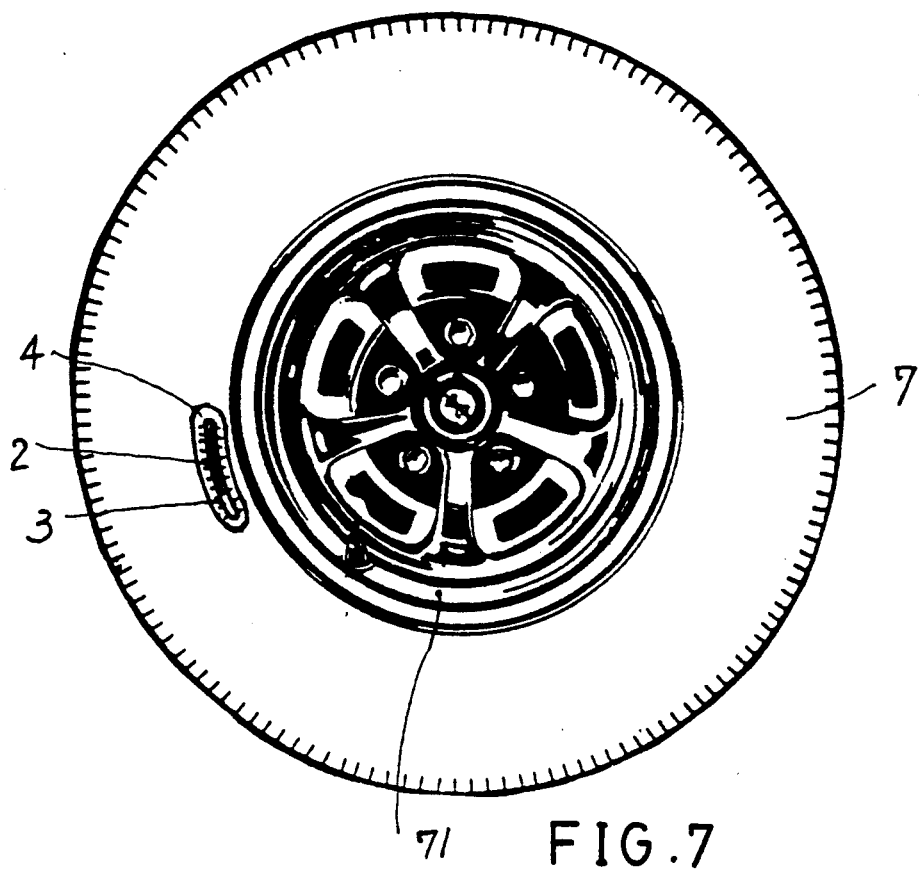
FIG. 7 shows still another preferred embodiment of the present invention.
Figure 8:
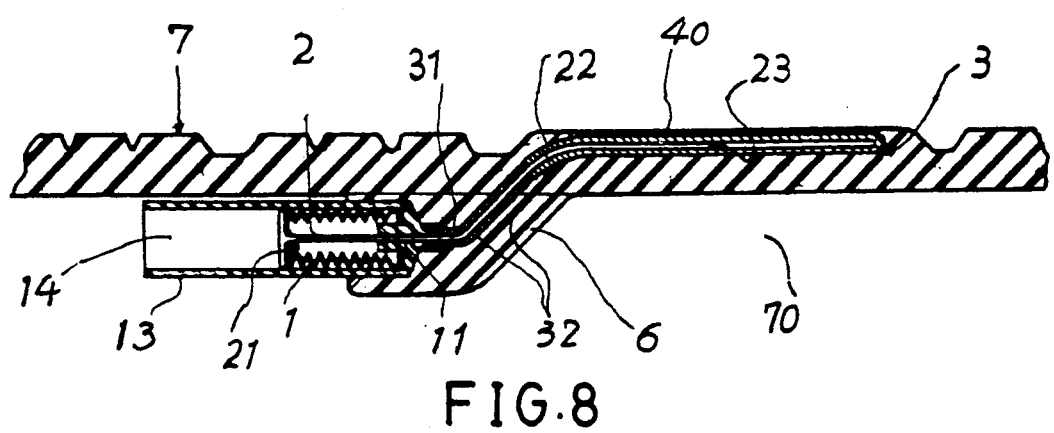

FIG. 8 is a sectional drawing of the present invention as shown in FIG. 7.

DETAILED DESCRIPTION

Figure 2:
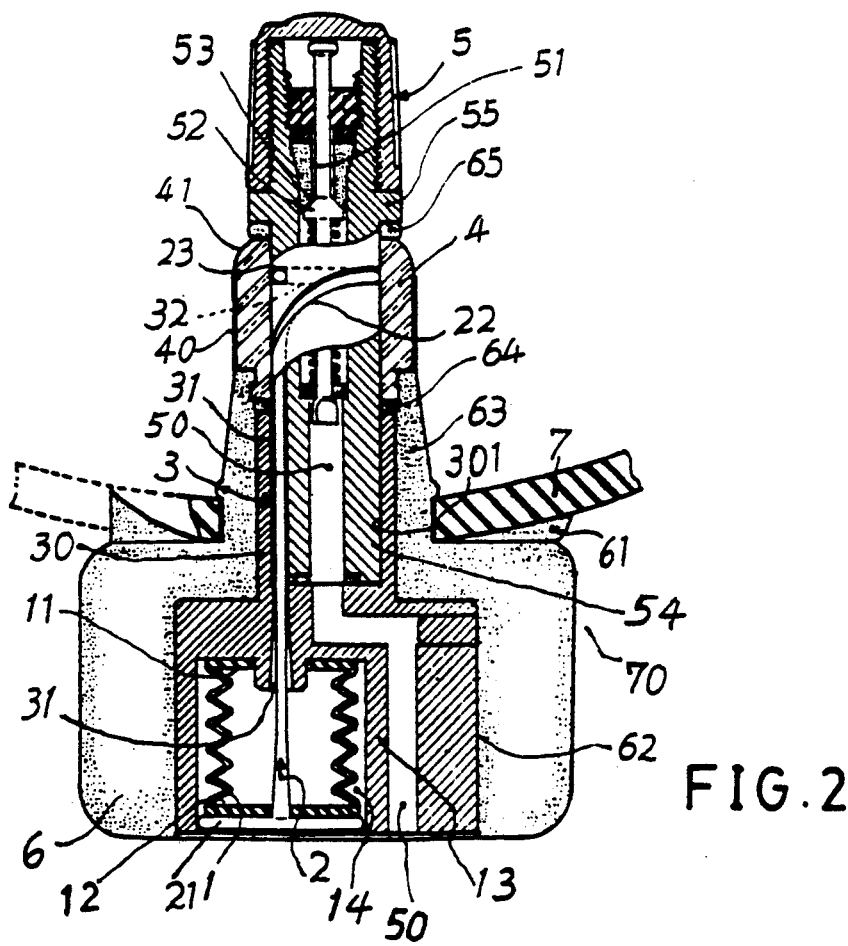
FIG. 2 is a sectional drawing of the present invention.
Figure 3:
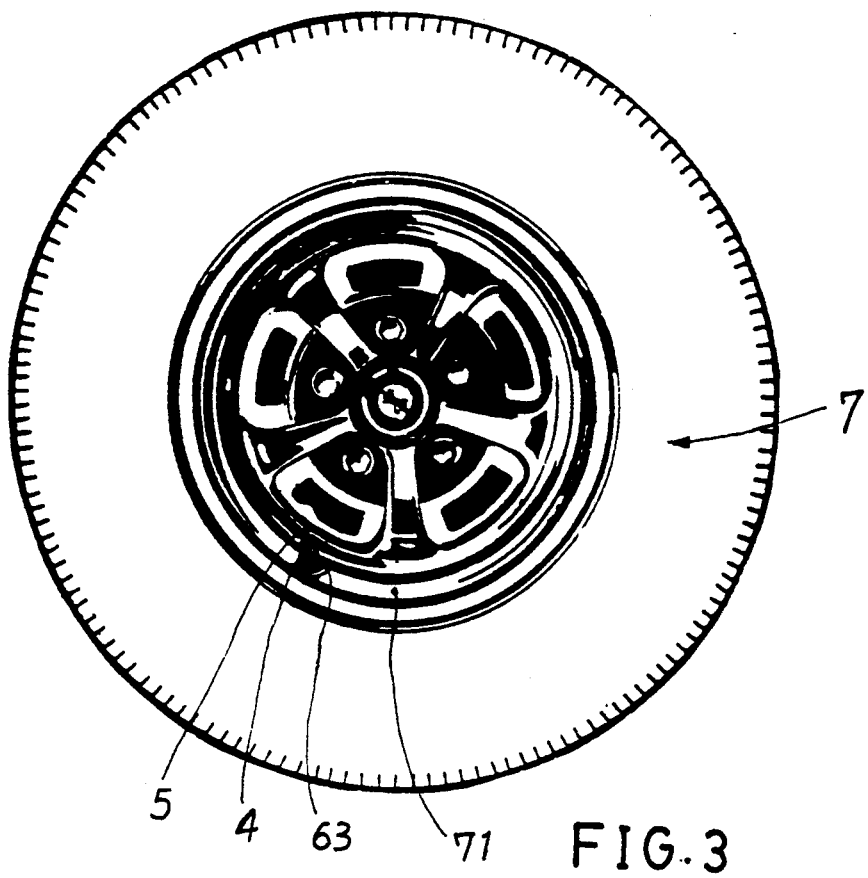
FIG. 3 is an illustration of the present invention when mounted on a tire.
Figure 4:
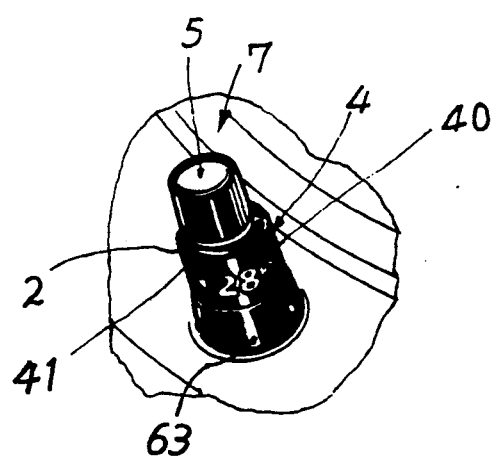
FIG. 4 shows the filling valve combinably formed with the present invention.

As shown in FIGS. 2, 3 and 4, a tire gauge of the present invention comprises: a bellows 1, a flexible indicator rod 2, a rod-guiding means 3, a transparent cover 4, a filling valve 5, and a packing means 6 for fixing the gauge and the valve 5 on a wheel tire 7.

The bellows 1 formed as a closed telecopic bag includes: a fixing end portion 11 formed on a first end portion of the bellows 1, a movable end portion 12 formed on a second end portion of the bellows 1 opposite to the fixing end portion 11, and a bellows holder 13 having a bellows chamber 14 recessed in the holder 13 for telescopically mounting the bellows 1 in the chamber 14 communicated with a tire interior 70 within the tire 7. The holder 13 may be made of heat conductive material so that a temperature inside the chamber 14 may be equal to that in the tire interior 70.

The flexible indicator rod 2 includes: a piston member 21 secured on an inner end portion of the rod 2 and secured with the movable end portion 12 of the bellows 1, an arcuate rod portion 22 formed on an upper portion of the rod 2, and an outermost end portion 23. The rod 2 especially the outermost end portion 23 may be coloured for a remarkable showing of pressure indication. The rod 2 may be made of plastic or other flexible, elastic materials. The rod 2 is protruded outwardly through a central hole formed in the fixing end portion 11 of the bellows 1.

The rod-guiding means 3 includes: a guiding tube 30 protruding outwardly from the bellows holder 13 having a straight rod hole 31 formed in a central portion of the tube 30, and an arcuate rod hole 32 formed on an outer or upper portion of the hole 31 slidably engageable with the arcuate rod portion 22 of the rod 2. The guiding tube 30 may be independently formed through the tire 7 or may be combinably secured with the filling valve 5 as shown in FIG. 2. The rod holes 31, 32 and an interior inside the bellows 1 is formed as a closed air chamber filled with air at normal temperature and pressure condition.

The filling valve 5 includes: an air passage 50 formed through the valve and communicated with the tire interior 70, a spindle 51 having a plug 52 secured therewith for sealing a valve seat 53 for closing the valve 5, and an inner tube 54 defining the air passage 50 therein insertably secured in a central hole 301 formed in the guiding tube 30 as packed by packing rings 64.

The transparent cover 4 generally cylindrical shaped is fixed on an upper end portion of the guiding tube 30 and sandwiched between a valve flange 55 and the tube 30 by another packing ring 65 as shown in FIG. 2. A convex portion 41 is annularly convexly formed on an upper portion of the cover 4 for forming a convex lens for magnifying an image of the indicator rod 2 slidably held in the rod hole 32. A graduation scale 40 is disposed around the cover 4 having a plurality of graduations annularly formed on the scale 40 for indicating a pressure value as pointed by the outermost end portion 23 of the indicator rod 2.

The packing means 6 includes: an inner packing member 61 sealably secured on an inside surface of the tire 7 having a socket 62 recessed in the member 61 for embedding the bellows holder 13 in the socket 62, and an outer packing member 63 sealably secured on an outer surface of the tire 7 for sealably mounting the guiding tube 30 through a fixing hole 72 formed through the tire or through a wheel ring 71 of a tire wheel.

When measuring a pressure inside a tire 7, the pressure in the tire interior 70 will urge the piston member 21 and the bellows 1 to compress the bellows 1 to raise the rod 2 outwardly or upwardly so as to allow the arcuate rod portion 22 to slidably move in the arcuate rod hole 32 which is generally formed as a circular hole defining a plane generally perpendicular to a longitudinal axis of the guiding tube 30 until a pressure-balanced position is reached, of which the outermost end portion 23 will indicate a measured pressure value as shown on the graduation scale 40 which can be clearly viewed through the transparent cover 4 especially after being magnified an image of the rod 2 by the convex portion 41 of the cover 4.

Figure 1:
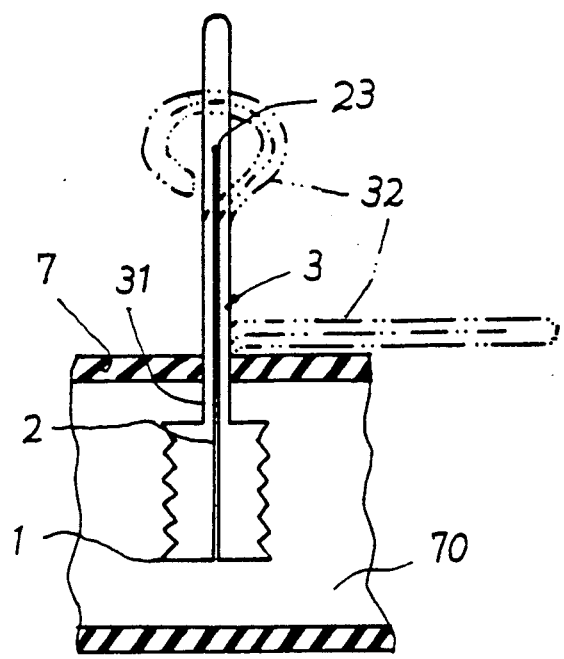
FIG. 1 is an illustration showing a basic operating principle of the present invention.

The bellows 1 is mounted in the tire interior 70 and also held in the holder 13 made of heat conductive material so that the pressure urging the bellows 1 and rod 2 is directly measured under a temperature in tire interior 70 without being influenced by a temperature difference between an interior and an outerior of the tire. So, this invention can be used to measure a tire pressure isothermally as truly obtained in the tire interior and is more precise than a data measured from outside the tire by using a conventional tire gauge. The operating principle is illustrated in FIG. 1 from which it is clear that the bellows 1 (serving a pressure "sensor") is formed in the tire interior 70.

Figure 5:
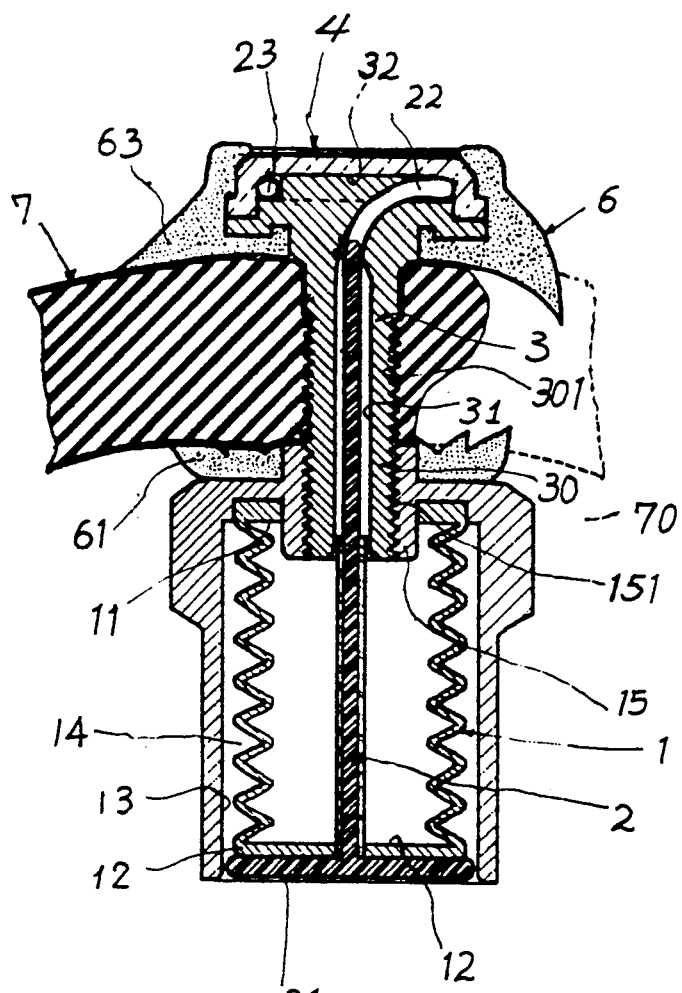
FIG. 5 is a sectional drawing of another preferred embodiment of the present invention.
Figure 6:
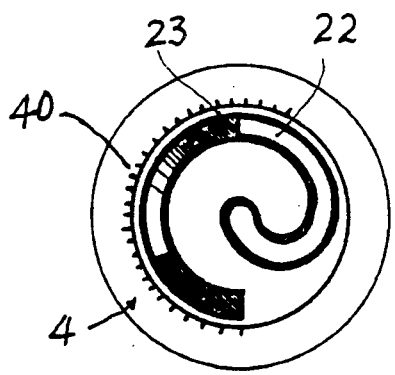
FIG. 6 is an illustration showing a measurement indication of the present invention.

As shown in FIGS. 5, 6, the guiding tube 30 of the rod-guiding means 3 can be modified from that as shown in FIG. 2 to form male threads 301 on the tube 30 engageable with female threads 151 formed in a sleeve portion 15 formed on a closed end portion of the bellows holder 13. The guiding tube 30 is protruded outwardly through the tire 7 to form an enlarged disk portion 33 having the arcuate rod hole 32 circularly formed in the disk portion 33 which is shielded by the transparent cover 4 generally circular shaped and having graduation scale 40 annularly formed on the cover 4 to be perspectively disposed along the arcuate hole 32.

The flexible indicator rod 2 includes the arcuate rod portion 22 deflected on an upper portion of the rod 2 to be wound in the arcuate rod hole or circular hole 32 formed in the disk portion 33.

The bellows holder 13 is secured to the tube 30 and sealably secured to the inner surface of the tire 7 by an inner packing member 61, whereas the disk portion 33, and the cover 4 are sealably secured to the outer surface of the tire 7 by an outer packing member 63 as shown in FIG. 5.

This modification is made to mount the gauge of the present invention on a tire portion, rather than in the filling valve 5 as aforementioned.

As shown in FIGS. 7, 8, the guiding tube 30 of the rod-guiding means 3 can be deflected from a straight hole 31 at numeral 32 to be generally linearly or arcuately overlain in an outer surface of the tire 7. The cover 4 can be simplified to be an elongate or arcuate strip as shown in FIG. 7 secured in the outer surface of the tire 7. The flexible indicator rod 2 can be made to be a generally linear structure arcuately formed on the tire. The holder 13 for telescopically mounting the bellows 1 therein is also juxtapositionally secured to the inner surface of the tire 7 as packed by the packing member 6 which may be integrally formed with the tire 7.

The arcuate hole 32 for the sliding movement of the rod 2 as shown in FIG. 2 is arcuately or circularly formed in an upper portion of the inner tube 54 of the valve 5. However, the inner tube 54 of the valve 5 may be combinably formed with the guiding tube 30 by those skilled in the art.

The bellows holder 13 of the present invention is made of heat conductive material so that the temperature inside the bellows 1 is isothermal to that of the tire interior 70. A heat-expansion coefficient of the air inside the bellows 1 is same as that of the tire interior 70, thereby minimizing a measurement error of the present invention.

I claim:

1. A tire gauge comprising:
a bellows telescopically mounted in a tire interior;
a flexible indicator rod secured with said bellows protruding outwardly through a rod hole formed in a rod-guiding means fixed in a fixing hole formed through a tire; said bellows and said rod hole in said rod-guiding means defining a closed air chamber filled with air at normal temperature and pressure condition;
a transparent cover secured on an upper outer portion of said rod-guiding means having a graduation scale formed thereon for showing a pressure indication value of said indicator rod slidably held in said rod-guiding means; and
a packing means sealably securing said rod-guiding means and said cover on said tire.

2. A tire gauge according to claim 1, wherein said bellows includes: a fixed end portion secured on a closed end portion of a bellows holder made of heat conductive material, a movable end portion opposite to said fixed end portion secured with said flexible indicator rod, said bellows holder secured with said rod-guiding means and having a bellows chamber recessed therein communicated with the tire interior.

3. A tire gauge according to claim 2, wherein said rod-guiding means includes: a guiding tube secured with said bellows holder of said bellows protruding outwardly and secured in said tire, a straight rod hole formed in said tube, and an arcuate rod hole arcuately formed on an outer portion of said guiding tube communicated with the straight rod hole for moving said flexible indicator rod in said rod hole.

4. A tire gauge according to claim 3, wherein said flexible indicator rod includes: a piston member secured with said movable end portion of said bellows, an arcuate rod portion secured on an outer portion of said rod, and an outermost end portion of said rod operatively indicating a pressure data as measured; said rod protruded outwardly through a central hole formed in said fixed end portion of said bellows and through said staight rod hole in said tube to have said arcuate rod portion of said rod slidably held in said arcuate rod hole in said guiding tube.

5. A tire gauge according to claim 3, wherein said guiding tube of said rod-guiding means includes an enlarged disk portion formed on an outer portion of said guiding tube having said arcuate hole arcuately formed in said disk portion.

6. A tire gauge according to claim 5, wherein said arcuate hole of said rod-guiding means is a circular hole engageable with the arcuate rod portion of said indicator rod slidably held in said guiding tube.

7. A tire gauge according to claim 5, wherein said disk portion is formed as a circular shape shielded by a circular transparent cover thereon having the graduation scale annularly formed on the cover and perspectively disposed along said circular hole in said disk portion.

8. A tire gauge according to claim 1, wherein said guiding tube is engageably secured with an inner tube of a filling valve of the tire, having an air passage formed in said valve and having a straight rod hole formed in said inner tube of said filling valve and having an arcuate rod hole circularly formed in an upper portion of said inner tube; a transparent cover generally cylindrical shape disposed around said upper portion of said inner tube having graduation scale formed on said cover; said indicator rod having said arcuate rod portion slidably held in said arcuate rod hole.

9. A tire gauge according to claim 8, wherein said transparent cover includes a convex portion formed on an upper portion of said cover for forming a convex lens for magnifying an image of said indicator rod through said convex portion.

10. A tire gauge according to claim 1, wherein said rod-guiding means is a guiding tube secured with a bellows holder juxtapositionally secured on an inner surface of a tire having said bellows telescopically mounted in said holder, said guiding tube deflected outwardly to have an outer tube portion thereon overlain in an outer surface of the tire, and said indicator rod secured to a movable end portion of said bellows slidably held in said guiding tube and deflected outwardly to be slidably held in said outer portion of said tube, said cover formed as an elongate arcuate shape covering said tube having graduation scale formed on said cover.

* * * * *